Patented Aug. 7, 1934

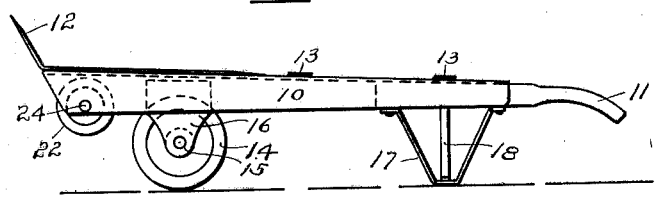
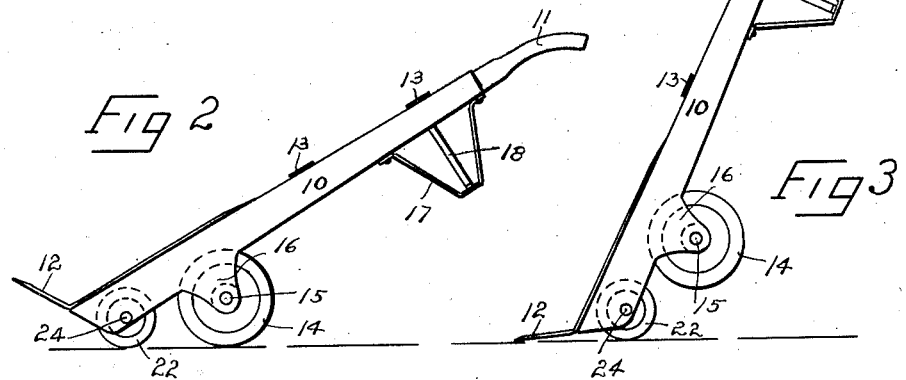
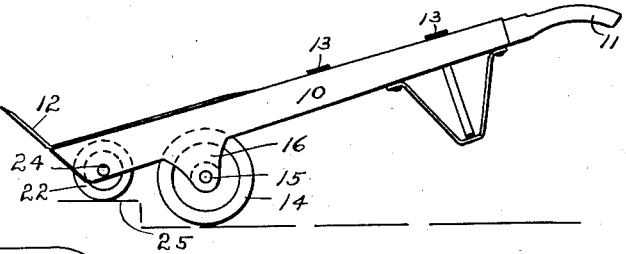
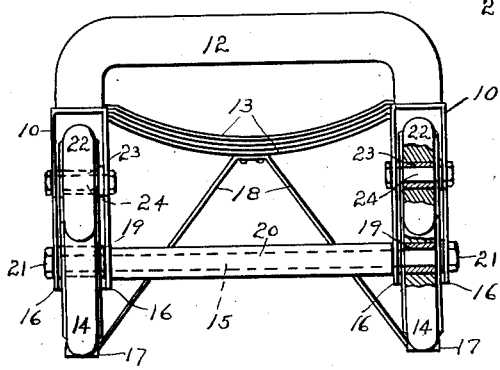

1,969,048

UNITED STATES PATENT OFFICE 1,969,048

HAND TRUCK

Landon D. Smith, Richmond Hill, N. Y.

Application October 22, 1932, Serial No. 639,003

3 Claims. (Cl. 280—54)

The invention relates to certain improvements in hand trucks and has for one of its main objects to provide means on such trucks whereby the loading, conveying and unloading of goods are greatly facilitated. Another object is to so proportion and locate these means that the weight of the load carried is more evenly distributed on the truck so as to reduce the amount of weight that the operator has to support. A further object is to so construct these means that the truck may be easily wheeled over ordinary obstructions, such as for example door sills, steps, uneven floors and the like. A still further object is to provide a hand truck, containing such means, which will occupy no more space than the ordinary truck, which will be no heavier in weight, which will be less liable to wear and breakage, and which can be manufactured at a low cost.

These and various other objects and advantages will be readily understood from the following description and from the accompanying drawing of a preferred embodiment of the invention in which, however, modifications may be made without departing from the scope of the appended claims. In the drawing:

Fig. 1 is a side elevation of the improved hand truck showing it in one position, Figs. 2, 3 and 4 are similar views showing the truck in various positions, and Fig. 5 is an end view of Fig. 1 drawn to a larger scale.

Referring now to the views, simultaneously, the truck is constructed, in the usual manner, of two side frames 10, which terminate in handle members 11 and to the front ends of which the nose iron 12 is secured. A plurality of cross bars 13 are secured to the side frames, and two standard wheels 14 are mounted on an axle 15 which is secured in brackets 16. Each side frame is also provided with a leg 17, and these legs are strengthened by a brace 18.

While ordinary wooden side frames may be used in connection with my invention, I prefer to construct the side frames of channel-shaped, pressed metal, as shown, and to attach separate handles in such a manner that these may be removed, when accidentally broken, and new ones substituted. The brackets 16 may either be formed integrally with the side frames, as shown in Figs. 2 to 5, or made as separate U-shaped parts, as shown in Fig. 1. I also prefer to mount the wheels 14 on sleeves 19 placed on the axle 15. These sleeves, together with the tubular spacing member 20, are clamped tightly between the brackets 16 by means of nuts 21 secured on the threaded ends of the axle, thus preventing them from rotating on the axle.

The invention resides mainly in adding two extra wheels 22 at the extreme front end of the truck and placing the standard wheels a greater distance from this end than is usually done. The wheels 22 rotate on sleeves 23 which are clamped inside the U-shaped side frames on bolts 24. Due to the U-shaped side frames, it is possible to locate all the wheels within the channel of these frames instead of on either the outside and inside of the frames, as in the case of truck now in use. This construction has many advantages.

The wheels 14 are preferably so located that the truck will stand in the position shown in Fig. 2 or, in other words, so located that, when in this position, the front end of the truck will overbalance the handle end. This construction makes it possible to wheel the ordinary load without the operator of the truck having to support any of its weight.

The wheels 22 are so located that their treads extend beyond the ends of the side frame so that the truck may be wheeled in the position shown in Fig. 3, thus making it very easy to place the toe iron under an article to be placed on the truck.

It is evident that the wheels 22 do not interfere with the wheeling of the truck in the ordinary manner, as for example shown in Fig. 4, but that, to the contrary, these wheels are an aid when an obstruction, as for example the step indicated at 25, is encountered. In such a case the wheels 22 are brought down on top of the step and the wheels 14 lifted clear of the step until they are again ready to be lowered.

While I have described and illustrated a so-called barrel truck constructed with sheet metal side frames, it will be understood that I do not wish to limit the invention to any particular type of truck, nor any particular construction, but wish to employ it on any hand truck where it may be used to advantage.

Having described my invention and its objects, what I claim as new and wish to protect by Letters Patent is:

1. A hand truck comprising a pair of channel-shaped side frames having handle members secured at one end, a plurality of cross bars connecting said side frames, a pair of legs secured to said handle members, a pair of wheels mounted at the extreme front ends of said side frames with their treads extending below the side frames and beyond the ends thereof, a second pair of larger wheels mounted on the side frames a greater distance from the front ends than the first-mentioned pair of wheels, and all of said wheels mounted within the channels of the side frames on sleeves clamped within the side frames and restrained from rotation.

2. A hand truck comprising a pair of channel-shaped side frames having handle members secured at one end, a plurality of cross bars connecting said side frames, a pair of legs secured to said handle members, a pair of wheels mounted at the extreme front ends of said side frames with their treads extending below the side frames and beyond the ends thereof, a second pair of larger wheels mounted on the side frames a distance sufficiently far back from the front ends to place the center of gravity of the truck at a point between these wheels and the first-mentioned wheels when the truck is at rest on both set of wheels, and all of said wheels mounted within the channels of the side frames on sleeves clamped within the side frames and restrained from rotation.

3. A hand truck comprising a pair of channel-shaped side frames, a handle member detachably secured in one end of each of said side frames, legs secured to said handle members, a plurality of cross bars and a nose-iron connecting said side frames, a pair of wheels mounted at the extreme front ends of said side frames with their treads extending below the side frames and beyond the ends thereof, a second pair of larger wheels mounted on the side frames a distance sufficiently far back from the front ends to place the center of gravity of the truck at a point between these wheels and the first-mentioned wheels when the truck is at rest on both set of wheels, and all of said wheels mounted within the channels of the side frames on sleeves clamped within the side frames and restrained from rotation.

LANDON D. SMITH.